Jan. 6, 1970    H. SCHMID ET AL    3,487,493
WINDSHIELD WIPER ARRANGEMENT
Filed Aug. 20, 1958    2 Sheets-Sheet 1

INVENTORS
HERMANN SCHMID
EMIL KIRBACH
BY
Diese and Craig
ATTORNEYS

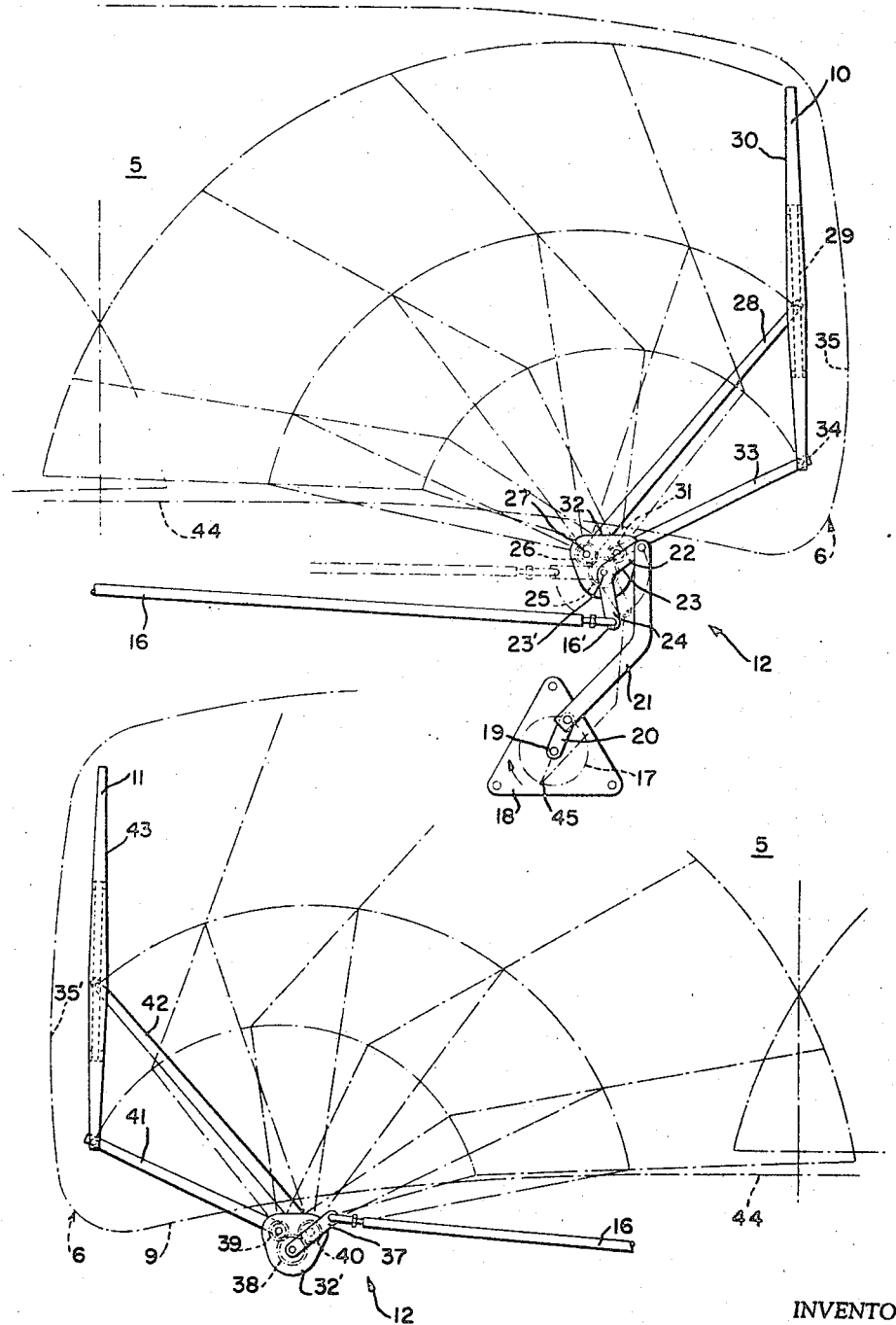

United States Patent Office 3,487,493
Patented Jan. 6, 1970

3,487,493
WINDSHIELD WIPER ARRANGEMENT
Hermann Schmid and Emil Kirbach, Maichingen, Kreis Boblingen, Germany, assignors to Daimler-Benz Aktiengesellschaft, Stuttgart-Unterturkheim, Germany
Filed Aug. 20, 1958, Ser. No. 756,200
Claims priority, application Germany, Aug. 27, 1957,
D 26,304
Int. Cl. B60s 1/28
U.S. Cl. 15—250.23        14 Claims The present invention relates to a windshield wiper arrangement, preferably for curved windshields, for the so-called panoramic windshields of motor vehicles provided with a pair of windshield wipers which are driven from a common drive in opposite directions with respect to each other.

The purpose of the present invention is to provide for the passengers of the vehicle, with the aid of an extended wiper range of the windshield wipers arranged at the windshield, a relatively large unimpaired field vision toward the front of the vehicle as well as also through the curved windshield parts toward the sides thereof even under unfavorable weather and/or road conditions.

In one of the known arrangements of the prior art, the wiper blades are disposed in the rest position thereof essentially horizontally in proximity to the lateral edge of the windshield and approach each other or come together in the inner approximately vertical reversing position thereof. With such an arrangement, a relatively large field of vision is achieved with flat windshields, during use of the windshield wipers, however, the application thereof to curved windshields produces even with strongly springily constructed wiper blades no cleaning or wiping action or only a relatively insufficient cleaning or wiping action on the lateral windshield parts.

Even with the use of straight wiper blades which move parallel to one another, the known drive mechanisms thereof found in the prior art are not suitable for curved windshields. Similarly, the known windshield-wiper tandem arrangement in which the connecting link of the two wiper arms simultaneously carries a further wiper blade is not suitable unless an additional costly auxiliary wiper arrangement is provided which minimizes these shortcomings.

The present invention obviates the shortcomings and inadequacies of the prior art.

According to the present invention, the wiper bars of the two windshield wipers, for example, of two arms each pivotally connected therewith and positively connected with one another are so guided that in the inner reversing or rest position thereof they are disposed approximately horizontally at or near the lower edge of the windshield, whereas in the outer reversing position thereof they are disposed essentially vertically along or near a respective lateral windshield edge. In connection therewith, each wiper bar may be pivotally connected, in a manner known per se, approximately in the center thereof with the free end of a windshield wiper arm pivotally secured at the vehicle body and at the lower end thereof near the driving connection thereof with the free end of a second arm also pivotally connected about an axis fixed in relation to the vehicle.

Accordingly, it is an object of the present invention to provide a windshield wiper arrangement for curved vehicle windshields, particularly for panoramic windshields in which the wiper blades clean effectively both the front and side parts of the curved windshield.

Another object of the present invention is to provide a windshield wiper arrangement and drive mechanism therefor by means of which the wiper arms and blades are driven in opposite directions with respect to each other in such a manner that in the outer reversing positions thereof they are essentially vertically disposed close to the edge of the lateral part of the curved windshield, whereas in the inner reversing position thereof, they are disposed essentially horizontally.

A further object of the present invention resides in the provision of a windshield wiper arrangement for panoramic windshields in which the wiper arms are driven in opposite directions with respect to each other while assuring that there cannot be interference of the wiper arms with each other when the two wiper arms come close to each other in the inner position thereof.

A further object of the present invention is the provision of a simple, reliable and relatively inexpensive installation and drive mechanism for windshield wiper arrangements used in connection wtih panoramic windshields of motor vehicles which obivate the shortcomings of the prior art.

These and other objects, features and advantages of the present invention will become more obvious from the following description when taken in connection with the accompanying drawing, which shows, for purposes of illustration only, one embodiment in accordance with the present invention, and wherein:

FIGURE 2 is a view taken from the inside of the vehicle and looking toward the right half of the windshield of FIGURE 1 provided with a windshield wiper arrangement in accordance with the present invention, the vehicle parts being omitted for clarity's sake.

FIGURE 3 is a view similar to FIGURE 2 taken from the inside of the vehicle and looking toward the left half of the windshield of FIGURE 1 provided with a windshield wiper arrangement in accordance with the present invention again omitting the vehicle parts for clarity's sake.

Figure 1:
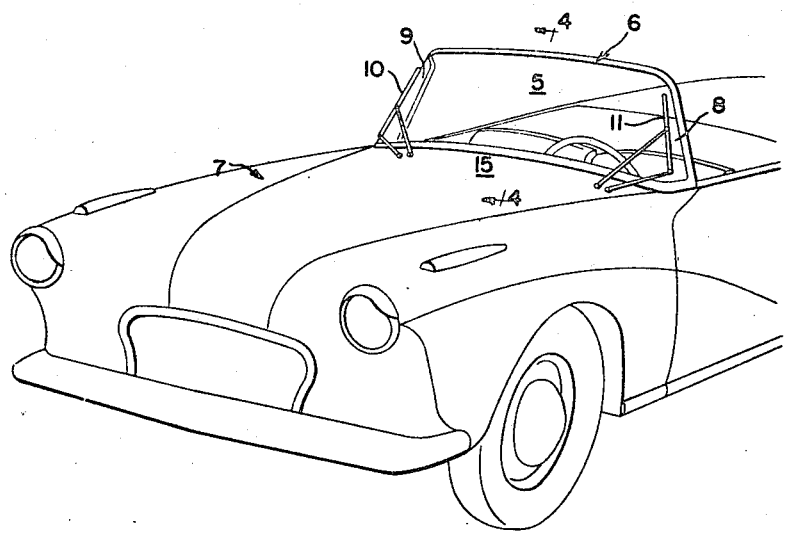
FIGURE 1 is a partial perspective view of a motor vehicle showing the front part thereof which is provided with a panoramic windshield and a windshield wiper arrangement in accordance with the present invention.

Referring now to the drawing, wherein like reference numerals are used throughout the various views to designate like parts and more particularly to FIGURE 1, reference numeral 6 generally designates therein the windshield which in the center portion 5 thereof is only slightly curved and inclined toward the rear in the usual manner. The windshield 6 is supported in any suitable manner on the motor vehicle generally designated by reference numeral 7. The windshield 6 passes over from the essentially straight central portion 5 into lateral parts 8 and 9 which are bent rearwardly, in a manner known per se, within these regions by almost 90°.

For purposes of keeping clean the windshield 6 against impinging rain water and other objects which impair the vision, a windshield wiper installation generally designated by reference numeral 12 (FIGURES 2, 3 and 4) including on each half of the windshield 6 a pivotal wiper blade 10 and 11, respectively, is secured at the vehicle frame parts or body parts 12, 14 and 15 (FIGURE 4) in such a manner that the pivot axes of the individual wipers 10 and 11 are each disposed approximately below the beginning of the windshield portions having a stronger or more pronounced curvature. By thus locating the individual windshield wiper blades 10 and 11 and by taking into consideration the inclination of the windshield and the form of the laterally bent or curved parts, the largest possible wiper field for each individual wiper is obtained. The two wiper blades 10 and 11 move partly toward each other and partly away from each other (FIGS. 1–3) as a result of the particular connection of the driving parts thereof by means of the connecting rod or linkage 16, etc., to be more fully described hereinafter, in contrast to the wellknown tandem arrangement according to which the wiper blades more in unison at all times.

Figure 4:
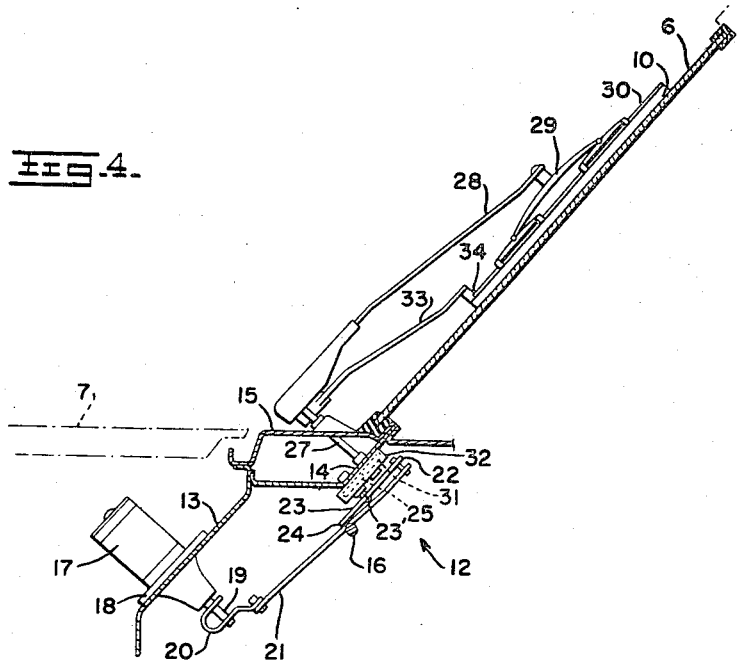
FIGURE 4 is a cross-sectional view taken along line 4—4 of FIGURE 1.

The pivotal movements of the two wiper blades 10 and 11 are realized by means of an electric motor 17 provided with a speed reduction gear, whereby the motor 17 is secured with the flange 18 thereof (FIGURE 4) on the upper part of the front wall 13 of the vehicle body. The shaft 19 of the motor 17 is provided at the end thereof extending into the interior of the vehicle with a crank arm 20 the free end of which is pivotally connected to the lower end of the connecting rod 21. The upper end of the connecting rod 21 is also pivotally connected with the relatively short upwardly-outwardly directed leg portion 22 of a pivotally supported angle lever 23 (FIGURES 2 and 4). The connecting rod 16 for the other wiper blade 11 is pivotally connected at 16' with the relatively longer leg portion 24 of the angle lever 23. The angle lever 23 is pivotally secured in a housing 32 by means of a shaft 23' rigidly connected with angle lever 23, the housing 32 being secured in any suitable manner at the vehicle body part 14. A gear 25 (FIG. 2) is rigidly secured on the shaft 23' within the housing 32. The gear 25 (FIG. 2) meshes with a second gear 26 which is secured on a shaft 27 also rotatably supported within the housing 32. The shaft 27 extends through the body part 15 toward the outside of the vehicle and carries at the outer end thereof the springy wiper arm 28 rigidly connected therewith. The flexible blade-retainer member 30 which retains the wiper blade 10 is pivotally suspended by the interposition of springy bow-shaped members 29 on the free end of wiper arm 28. By the use of such a suspension, which is known per se for the most part, the wiper blade 10 is placed in the position so as to adapt itself as far as possible to the prevailing curvature of the windshield 6.

A further gear 31 also meshing with the drive gear 25 is arranged apporximately in the same horizontal plane as gear 26 which effects the swinging movement of the wiper blade 10 at a distance therefrom within housing 32. The shaft of gear 31 which is rotatably supported in housing 32 and which extends therethrough as well as through the vehicle body part 15 toward the outside of the vehicle carries at the outer end thereof a guide member 33 which is disposed also approximately parallel to the plane of the windshield 6 and the free end of which is pivotally connected at 34 to the lower end of the wiper blade retainer member 30. The guide member 33 is disposed at a lesser distance from the windshield 6 than the drive arm 28.

The drive elements for the wiper blade 11 are arranged on the other half of the windshield 6 (FIGURE 3) in basically the same manner, however, in a mirror image-like fashion with respect to that illustrated in FIGURE 2. The lever 37 connected with the drive arm 24 of angle lever 23 by means of connecting link 16 is securely connected with a gear 38 by means of the shaft thereof which is rotatably supported in housing 32'. The gear 38 simultaneously meshes with two gears 39 and 40, respectively, the shafts of which are also rotatably supported in housing 32' and carry on the ends thereof extending through the housing 32' the levers 41 and 42, respectively, which are pivotally connected with the wiper blade retainer member 43. The levers 41 and 42 correspond to elements 33 and 28 of FIG. 2 and constitute a guide member (41) and wiper arm (42), respectively. The length of the pivotal lever members 28, 33 and 42, 41 and the number of teeth in the gears 25, 26, 31 and 38, 39, 40 used on both sides (FIGS. 2 and 3) of the windshield wiper arrangement in accordance with the present invention are so selected and matched to each other that both windshield wiper blades 10 and 11, during the swinging movement of the angle lever 23 caused by rotation of the drive motor 17, traverse the same path in opposite directions to each other and thereby assume essentially mirror-image-like identical positions.

In FIGURES 2 and 3, a number of the corresponding positions of the two wiper blades 10 and 11 as well as of the associated guide levers 28, 33 and 41, 42, are indicated in dot-and-dash lines. As may be seen from FIGURES 2 and 3, the two wiper blades 10 and 11 assume at first an essentially vertical position close to the lateral edges 35 and 35' of windshield 6 in which the blades 10 and 11 may follow without difficulty the curved contour of the windshield 6. The more the blades 10 and 11 thereupon move in opposite directions to one another toward the more flat windshield center portion 5 the more they approach the horizontal positions thereof only to cross each other with the wiper regions thereof shortly before the rest positions thereof in proximity to the lower windshield edge 44.

In order to reliably avoid any interfering collision of the two wiper blades 10 and 11, the two drive housings 32 and 32' are so installed that in the rest position thereof the wiper blade 10 is disposed slightly above the other wiper blade 11. In this position of the wiper blade 10, the short leg portion 22 of the angle lever 23 is directed at an incline outwardly and downwardly, whereas the longer leg portion 24 as well as the connecting link 16 are disposed approximately in the horizontal positions thereof as shown in FIGURE 2 in dash line.

In the rest position of the wiper blades 10 and 11, the crank pin of the crank arm 20 of driving motor 17 is in the position indicated in FIGURE 2 by reference numeral 45. With a rotary movement of the motor shaft 19 in the clockwise direction, the crank arm 20 pivotally connected to the connecting rod 21 describes a circular arc about the center of the motor shaft 19 and thereby swings the angle lever 23 out of the rest position thereof by means of the connecting rod 21 at first in the counterclockwise direction through a predetermined angular distance. Simultaneously therewith, the lever 37 connected with the angle lever 23 by means of connecting rod 16 is swung in the clockwise direction on the other side of the vehicle, and more particularly through a smaller angular distance than the lever 23 since the arm 24 of angle lever 23 is disposed in the rest position thereof at an angle of 180° with respect to the connecting link 16 whereas the lever 37 in the rest position thereof forms an acute angle with the connecting rod 16. As a result thereof, the wiper blade-retainer 30, which is disposed above the blade-retainer member 43 in the rest position thereof, is forced to traverse at first during the initial upward movement thereof a relatively larger distance than the wiper blade-retainer member 43 disposed therebelow, whereby a collision of the two blade retainer members 30 and 43 is prevented notwithstanding the initial intersection or overlap of the effective wiping areas or ranges thereof. Whereas the crank arm 20 now rotates in the clockwise direction, the wiper blade-retainer members 30 and 43 move in opposite directions from the innermost to the outermost position thereof through the intermediate position shown in FIGURES 2 and 3 in dot-and-dash lines whereby, as a result of the oppositely directed arrangement of the levers 24 and 37 described hereinabove, the wiper blade-retainer member 30 traverses during the latter part of the outward movement a smaller distance than the wiper blade-retainer member 43 in order to compensate for the initial smaller velocity thereof. Consequently, both wiper blade-retainer members 30 and 43 are again at the same distance from the windshield center 5 in the outermost, reversing positions thereof shown in full lines in FIGURES 2 and 3.

Whereas the crank arm 20 thereupon traverses the second half of its angular movement in the clockwise direction, the two wiper blade-retainer members 30 and 43 again move inwardly in the same speed ratio as before so that the wiper blade-retainer member 30, toward the end of the inward movement thereof, again has a greater velocity than the wiper blade-retainer member 43 in order, on the one hand, not to come in contact with blade-retainer member 43, however, on the other, to reach the center reversing or rest position thereof at the same time as blade-retainer member 43. Upon further rotation of the crank arm 20, the operation of the wiper blade-retainer members 30 and 43 described hereinabove for one cycle repeats itself for such a length of time until the driving motor 17 is disengaged or turned off. The control arrangement for motor 17 is thereby made, in any conventional manner known per se in the prior art, so that the motor 17 upon disengagement or turning-off of the windshield wipers, for example, by actuation of the corresponding control knob only comes to a standstill if the wiper blade-retainer members 30 and 43 again are in the rest position thereof regardless of the position thereof and of crank arm 20 when the control knob was initially turned off.

While we have shown and described one embodiment in accordance with the present invention, it is understood that the same is not limited thereto but is susceptible of many changes and modifications within scope and spirit of the present invention, and we, therefore, do not wish to be limited to the details described herein of the single illustrated embodiment but intend to cover all such changes and modifications as are within the scope of the appended claims.

We claim:

1. A windshield wiper arrangement, especially for panoramic windshields of motor vehicles having a lower edge and lateral edges, two wiper blade-retainer members each having arm means drivingly connected therewith and drive means operatively connected with said arm means for driving said wiper blade-retainer members in opposite directions relative to each other and to inner reversing positions thereof including connecting means connecting said arm means to said drive means, the respective wiping areas of said two wiper blade-retainer members intersecting each other in the center portion of said windshield, said drive means including said connecting means comprising means for disposing one of said blade-retainer members in a position above the other in said inner reversing positions of said members, said drive means including means precluding mutual interference of said blade-retainer members.

2. A windshield wiper arrangement, especially for panoramic windshields of motor vehicles, comprising two wiper-blade retainer members each having arm means, drive means operatively connected with each said arm means for driving said wiper blade-retainer members in opposite directions relative to each other and to inner reversing positions thereof said drive means having individual gear means and individual shaft means drivingly connected respectively to each of said arm means, each of said gear means comprising a driving gear, each of said shaft means comprising a driving shaft operatively connected to said driving gear, a lever mounted on each said driving shaft, a connecting rod pivotally secured to a free end of each of said levers in such a manner that in said inner reversing positions of said blade-retainer members one of said levers forms an angle of about 180° with said connecting rod and the other lever an acute angle therewith.

3. A windshield wiper arrangement according to claim 2, wherein the wiping areas of said two wiper blade retainers overlap in the center portion of the windshield, and wherein one of said blade-retainer members is disposed below the other in said inner reversing positions of said members, said other of said blade retainer members being operatively connected with said one of said levers.

4. A windshield wiper arrangement, especially for a motor car panoramic windshield having a lower edge and lateral edges, comprising two wiper blade-retainer members each having arm means drivingly connected therewith and drive means operatively connected with said arm means for driving said wiper blade-retainer members in opposite directions relative to each other and to inner reversing positions thereof including connecting means connecting said arm means, the respective wiping areas of said two wiper blade-retainer members intersecting each other in the center portion of said windshield, one of said blade-retainer members being disposed below the other in said inner reversing positions of said members, said connecting means comprising levers and a connecting rod connecting said levers, one of said levers forming an angle of 180° with said connecting rod and the other of said levers forming an acute angle with said connecting rod when said blade-retainer members are in said inner reversing position, said one of said blade-retainer members being operatively connected with said one of said levers.

5. A windshield wiper arrangement according to claim 4, wherein one of said levers is an angle lever having two leg portions, said connecting rod being pivotally connected with one of said leg portions, and a further connecting rod pivotally connected with the other leg portion at one end thereof and at the other end thereof with said drive means.

6. A windshield wiper arrangement especially for a panoramic windshield of a motor vehicle, comprising two wiper blades disposed in wiper blade-retainer members, said blade-retainer members each having arm means pivotally connected therewith, each said arm means including two arms, drive means operatively connected with each said arm means for driving each of said blade retainer members in opposite rotative directions relative to each other and to inner reversing positions thereof, the areas of said windshield swept by said wiper blades overlapping in the region of said inner reversing positions of said blade-retainer members, said drive means including means for disposing one of said blade-retainer members directly above the other when said members are in said reversing positions.

7. A windshield wiper arrangement especially for a panoramic windshield of a motor vehicle, according to claim 6, wherein said drive means comprises means for driving said one of said blade retainer members at a higher speed than the said other of said blade-retainer members upon initial movements of said retainer members from said inner reversing positions, said drive means including means for driving said other of said blade-retainer members at a higher speed than said one of said blade retainers upon entering said positions.

8. A windshield wiper arrangement especially for a panoramic windshield of a motor vehicle, according to claim 6, wherein said drive means operatively connected with each said arm means comprises closely adjacent shafts for supporting said two arms of each said arm means, gears on said shafts having differing numbers of teeth, and a driving gear drivingly engaging each of said gears.

9. A windshield wiper arangement according to claim 8, wherein said drive means further comprises shafts for supporting said driving gears, levers mounted on said last-mentioned shafts and a connecting rod having pivotal connections at its ends with said levers.

10. A windshield wiper arrangement according to claim 9, wherein one of said levers, when said members are in said inner reversing positions, forms an angle of 180° with said connecting rod and the other of said levers forms an acute angle therewith.

11. A windshield wiper arrangement according to claim 10, wherein said one of said blade-retainer members is operatively connected with said one of said levers.

12. A wiper system for a windscreen including, a pair of wiper blades, said wiper blades being oscillatable through strokes having overlapping paths over a portion of said windscreen, means for imparting conjoint oscillation to said wiper blades in phase opposition and for precluding interference between said wiper blades during movement through their overlapping paths.

13. Cleaning mechanism for a vehicular windshield including, a pair of wiper shafts located on opposite sides of the center line of the windshield, a wiper arm drivingly connected to each wiper shaft, a wiper blade carried by each wiper arm, the distance between each wiper shaft and the outer tip of its wiper blade being more than half the distance between the wiper shafts whereby said wiper blades have overlapping paths over the windshield adjacent their inboard stroke ends, one of said wiper blades being located above the other wiper blade adjacent their inboard stroke ends, means for imparting conjoint oscillation in phase opposition and for precluding interference between said wiper blades during movement through their overlapping paths, the angular velocity of the upper wiper blade being greatest adjacent the inboard stroke end thereof so that the upper wiper blade will move quickly behind and out of the way of the lower wiper blade adjacent its inboard stroke end.

14. Cleaning mechanism for a vehicular windshield including, a pair of wiper shafts located on opposite sides of the center line of the windshield, a wiper arm drivingly connected to each wiper shaft, a wiper blade carried by each wiper arm, the distance between each wiper shaft and the outer tip of its wiper blade being more than half the distance between the wiper shafts whereby said wiper blades have overlapping paths over windshield adjacent their inboard stroke ends, one of said wiper blades being located above the other wiper blade adjacent their inboard stroke ends, means for imparting conjoint oscillation in phase opposition and for precluding interference between said wiper blades during movement through their overlapping paths, the angular velocity of the upper blade being greater adjacent the inboard stroke end thereof than the angular velocity of the lower wiper blade so that the upper wiper blade will move quickly behind and out of the way of the lower wiper blade adjacent its inboard stroke end.

References Cited

UNITED STATES PATENTS

| | | | |
|---|---|---|---|
| 1,660,971 | 2/1928 | Lindner | 15—250.9 |
| 2,760,221 | 8/1956 | Hitzelberger | 15—253 |
| 2,834,038 | 5/1958 | Kramer | 15—255 |
| 2,324,894 | 7/1943 | Whitted | 15—250.9 |

FOREIGN PATENTS

| | | |
|---|---|---|
| 1,162,314 | 4/1958 | France. |

ROBERT W. JENKINS, Primary Examiner